Oct. 17, 1961 H. L. HUTCH 3,004,579
PROCESS OF MAKING A DUAL CHAMBER PNEUMATIC
TIRE AND THE TIRE SO MADE
Filed June 22, 1959 2 Sheets-Sheet 1

INVENTOR
Harry L. Hutch
BY McCoy, Greene & te Grotenhuis
ATTORNEYS

Oct. 17, 1961 H. L. HUTCH 3,004,579
PROCESS OF MAKING A DUAL CHAMBER PNEUMATIC
TIRE AND THE TIRE SO MADE
Filed June 22, 1959 2 Sheets-Sheet 2

INVENTOR
Harry L. Hutch
ATTORNEYS

United States Patent Office 3,004,579
Patented Oct. 17, 1961

3,004,579
PROCESS OF MAKING A DUAL CHAMBER PNEUMATIC TIRE AND THE TIRE SO MADE
Harry L. Hutch, Cuyahoga Falls, Ohio, assignor to The General Tire & Rubber Company, Akron, Ohio, a corporation of Ohio
Filed June 22, 1959, Ser. No. 822,060
11 Claims. (Cl. 152—342)

This invention relates to a process of making a dual chamber pneumatic tire having an integral interior wall that is spaced inwardly from the body of the tire and to the dual chamber tire so made.

The process of the present invention utilizes the thermoplastic properties of nylon cords to form a tire having a cord reinforced interior wall that is integral with the bead portion of the tire body and that is spaced inwardly away from the tread and side wall portions of the tire body.

In order to impart to nylon cords the stretch resistance necessary to provide effective reinforcement for pneumatic vehicle tires, it has been found necessary to subject the nylon cords to a preliminary heat treatment in which they are heated to a temperature approaching the melting point of the nylon and subjected to a tension which elongates the heated cords. The cords are then cooled while tension is maintained to set the cords and hold them in their elongated form. The cords so treated are commonly referred to as "prestretched" cords. When such prestretched nylon cords are heated to a temperature above 300° F. such as employed for vulcanizing tires, they regain their elasticity and develop a tension which, unless restrained, will shrink them back to nearly their original length. This property of nylon cords is utilized in the process of the present invention to shrink an inner band or wall that is integral with the bead portions of the tire body and that is separated by a layer of adhesion preventing material from the tread and side wall portions of the tire body and that has been vulcanized in contact with the interior of the tire body, the shrinking of the cords serving to draw the inner wall or band away from the tread and side wall portions of the tire body to provide an air chamber within the tread and side walls that will protect the cord reinformed inner band or wall against puncture, so that by inflating the inner and outer chambers of the tire, the inner wall will provide a support for the tire when there is a puncture or rupture in the tread or side walls of the tire body.

In building a tire by the process of the present invention an inner band of uncured rubber reinforced with prestretched nylon cords is laid on a tire building form and covered except along its marginal edges with a layer of adhesion preventing material such as paper or an inert powdered material such as talc combined with enough binder to provide a cohesive coating. After application of the adhesion preventing material, the tire body consisting of layers of uncured rubber and cord fabric is built up upon the inner band and adhered to the marginal edge portions of the inner band. Inextensible bead rings are then applied to the adhered edge portions of the inner band and tire body and the reinforcing cords of the superposed band and body are wrapped around the bead rings. The tire is then vulcanized in a tire building mold at a temperature of at least 300° F. The heat of vulcanization puts the prestretched nylon cords of the inner band under tension so that by admitting fluid under pressure to the space between the unadhered portions of the inner band and tire body, the heated prestretched cords of the inner band will be caused to shrink and draw the inner band inwardly away from the tire body to provide an inner wall that is spaced inwardly from the tread and side wall portions of the tire body and that is integral with the tire body in the bead portions of the tire.

After shrinkage the inner wall provides, with the tire body and the wheel rim on which the tire may be mounted, an inner inflation chamber for supporting the load in the event of rupture of the tread or side walls of the tire body, and an outer chamber which when inflated holds the tread and side wall portions of the tire body away from the inner wall to protect the inner wall against puncture so that the tire will be supported by the inner wall if the air pressure is released from the outer chamber due to a leak in the tread or side wall portions of the tire.

To effect the shrinkage of the inner band or wall, the tire is preferably transferred from the tire vulcanizing mold while still very hot to a supporting and inflating device where fluid under pressure is admitted to the interior of the inner band and to the space between the unadhered portion of the inner band and tire body to equalize the pressure on the interior and exterior of the inner band so that the tension in the heated nylon cord bands causes the inner band to shrink away from the tire body. The cords of the tire body may be of any of the materials commonly employed for reinforcing tire casings such as cotton, rayon or wire. The tire body may be reinforced with nylon cord and, if so, the nylon cords of the tire body are preferably either prestretched and set to a smaller percentage of elongation than the cords of the inner band, or are cords that have not been subjected to a prestretching operation. Nylon cords which have not been subjected to prestretching are hereinafter referred to as "unset" nylon cords. Lightly prestretched or unset nylon cords are preferred for the tire body for the reason that such cords permit the tire body to be expanded on the tire supporting and inflating device to a size greater than the cavity in which the tire was molded, such expansion of the tire body causing the heated nylon cords to be stretched during the completion of the vulcanization of the rubber which occurs after the tire is removed from the vulcanizing mold. The pressure is maintained on the tire body until the nylon cords of the tire body are cooled enough to set them in their elongated condition, the stretching and setting of the cords after they are embedded in the rubber serving the same purposes as a prestretching of nylon cords before placing them in a tire, the cords in both cases being made resistant to stretching while the tire is in service. The expansion of the tire body, combined with the shrinkage of the inner band, makes it possible to provide an outer air chamber of greater radial depth than would otherwise be possible, that will afford better protection of the inner wall against puncture.

Reference should be had to the accompanying drawings forming a part of this specification, in which.

Figure 1:
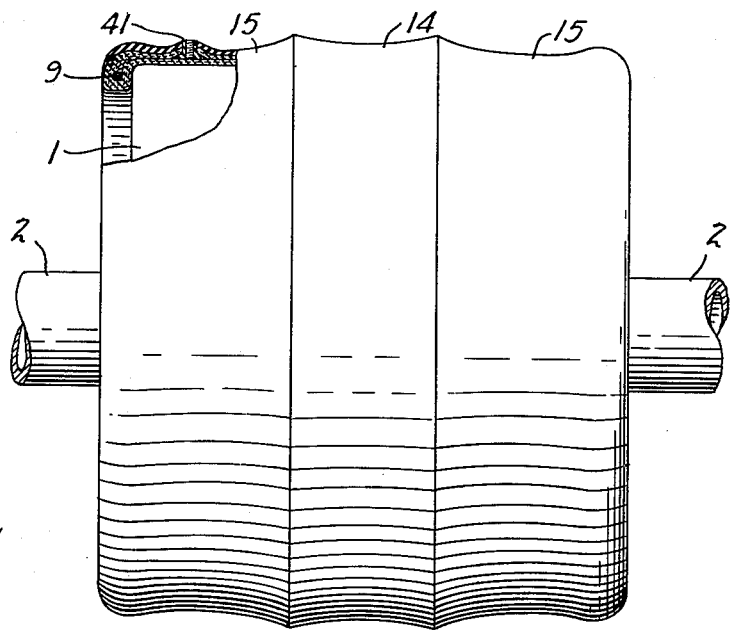
FIGURE 1 is a side elevation of a tire building form of the cylindrical drum type with the fabric and rubber layers forming the tire of the present invention laid thereon.

In building the tire of the present invention the layers of uncured cord reinforced rubber are laid upon a tire building form which is preferably in the form of a collapsible, cylindrical drum such as that indicated by the numeral 1 in FIG. 1. The tire building drum is mounted upon a suitable rotatable shaft 2 to facilitate the application of the successive layers of cord fabric and rubber. In building the tire of the present invention a layer of uncured rubber 3 in the form of a strip wider than the length of the drum 1 is laid in the form of a circumferentially continuous band on the periphery of the drum. Two plies 4 of prestretched bias cut nylon tire cord fabric are wrapped about the inner band 3 of rubber and a second layer 5 of uncured rubber is laid exteriorly of the plies 4. The thin rubber layers 3 and 5 and the two plies 4 of prestretched nylon fabric form an inner band which is later separated from the body of the tire to form the inner wall of the dual chamber tire. To separate the inner band from the body of the tire, a covering 6 of adhesion preventing material is applied exteriorly to the rubber layer 5. The covering 6 extends throughout the circumference of the inner band and is of a width only slightly less than the length of the drum so that the entire external surface of the rubber layer 5 is covered by the adhesion preventing material except for the marginal portions thereof at the ends of the drum. A layer of uncured rubber 7 is placed exteriorly of the adhesion preventing layer 6 and extends beyond the side edges of the layer 6 where it is adhered to the underlying layer of uncured rubber 5. Cord fabric plies 8 are applied exteriorly of the rubber layer 7. The fabric plies 4 and the layers 3 and 5 of rubber which form the inner band are folded inwardly over the ends of the drum 1 and the rubber layer 7 and cord fabric plies 8 also extend past the end of the drum and are folded over the drum shoulders.

An inextensible bead ring 9 is applied to the superimposed layers of rubber and fabric that overhang the drum shoulders, each of the bead rings 9 being enclosed in a flipper strip 10 that is wrapped about the bead ring and has end portions stitched to the fabric plies 8 outwardly of the bead ring to hold the bead ring in place while projecting portions of the rubber and fabric underlying the bead ring are wrapped around the bead ring. The cord fabric plies 8 are wider than the rubber strips 7 and have edge portions 11 that project past the edges of the rubber strip 7 and which are stitched to the flipper strips 10 outwardly of the bead rings. Outer plies 12 of cord fabric are laid upon the plies 8 and the plies 12 are of a width to project beyond opposite ends of the drum and have edge portions 13 that are folded inwardly over the outer side faces of the bead rings and against the portion of the inner rubber layer 3 that underlies the bead rings. The fabric plies 4 of the inner band are wider than the rubber layers 3 and 5 and are folded against the exterior of the bead rings and stitched to the outer plies 12. An exterior covering of uncured rubber forming a tread 14 and thinner side wall covering portions 15 are applied exteriorly of the outer plies 12.

The cord fabric plies 4, 8 and 12 are preferably in the form of bias cut cord fabric laid in the conventional manner with the cords of successive plies disposed in crossing relation.

Figure 2:
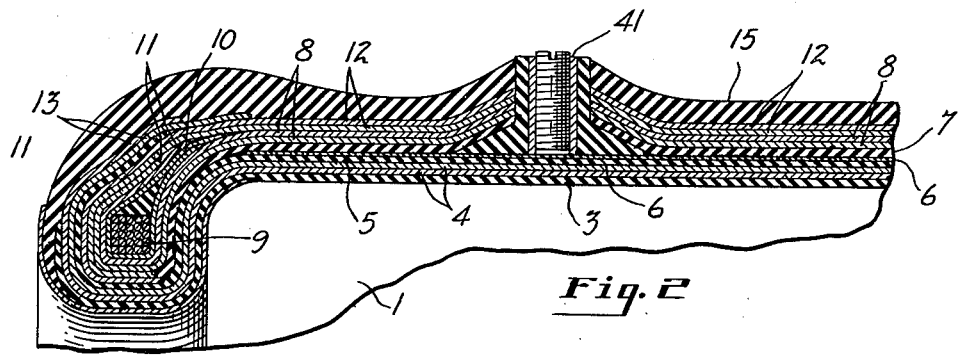
FIG. 2 is a section on an enlarged scale through an edge portion of the tire as it is built upon the cylindrical form shown in FIG. 1.
Figure 3:
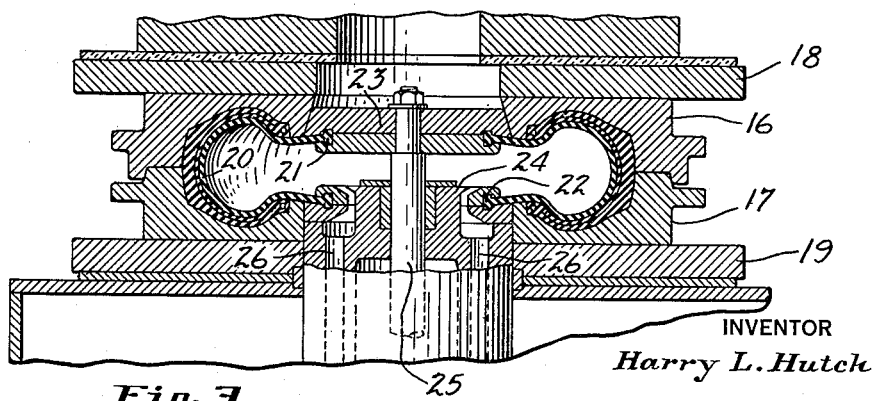
FIG. 3 is a sectional view showing the tire expanded into conformity with the interior of a tire vulcanizing mold of conventional construction.
Figure 5:
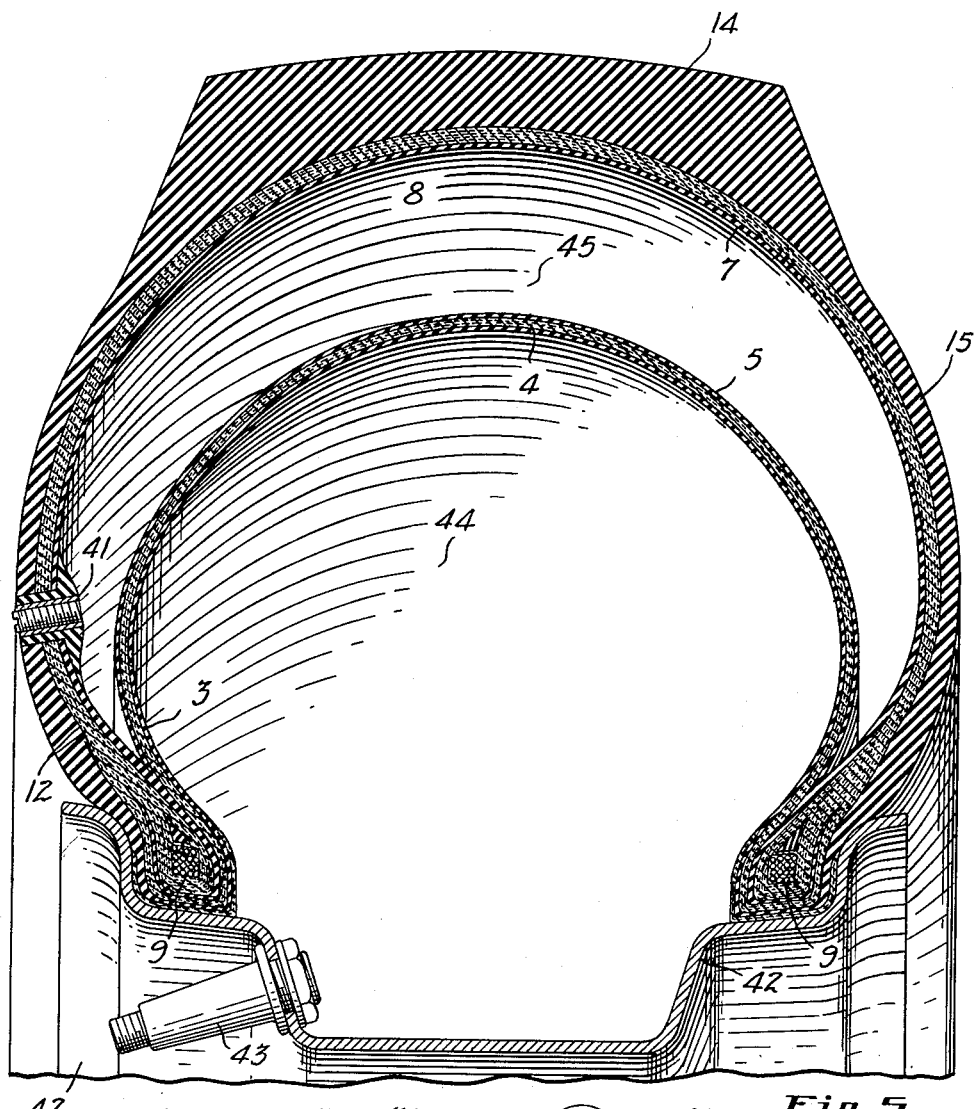
FIG. 5 is a transverse section through the completed tire showing the same mounted on a conventional wheel rim.

After the uncured tire is built as illustrated in FIGS. 1 and 2, it is transferred to a tire vulcanizing mold of conventional construction where it is expanded to toroidal form in the cavity of a tire vulcanizing mold. As shown in FIG. 3, the tire vulcanizing mold has upper and lower annular sections 16 and 17 that are attached to upper and lower press platens 18 and 19. The mold is provided with an inflatable diaphragm 20 which serves to expand the tire from substantially cylindrical form to toroidal form in the mold cavity. The diaphragm 20 has upper and lower beads 21 and 22 that are clamped to central mold closure members 23 and 24 that fit within the annular mold sections 16 and 17. The upper mold closure members 23 can be moved upwardly away from the lower closure member 24 and to extend the diaphragm 20 to substantially cylindrical form, the upper platen 18 and mold section 16 being movable vertically a distance sufficient to position the upper mold section 16 far enough above the upper closure member 23 when it is positioned to hold the diaphragm 20 in extended position to permit a tire to be placed in a position surrounding the diaphragm 20, after which the upper platen 16 is lowered into engagement with the upper closure member 23 and fluid under pressure is admitted through passages 25 and 26 in the lower closure member 24 to inflate the diaphragm and expand the tire casing while the mold is closing.

Steam or other heated fluid is circulated through the interior of the diaphragm 20 and maintained under sufficient pressure to conform the tire to the mold while it is being vulcanized. The vulcanizing temperature is maintained preferably above 300° F. in order to reduce the time of vulcanization and also to heat the prestretched nylon cords of the inner band sufficiently to put them under tension.

Figure 4:
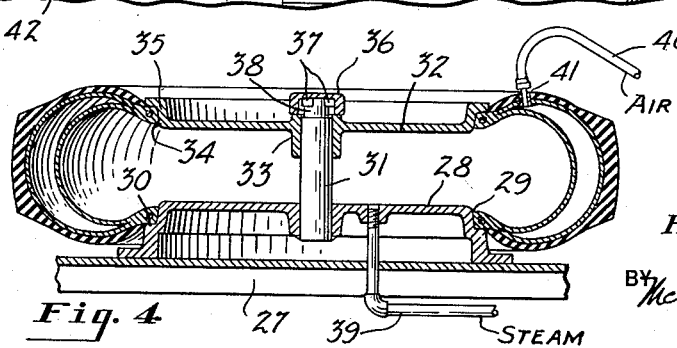
FIG. 4 is a sectional view showing the tire on a supporting and inflating device to which it is transferred from the vulcanizing mold.

When the vulcanization of the tire is nearly completed, the mold is opened and the tire is removed from the mold and placed while still very hot on a suitable tire supporting and inflating device such as illustrated in FIG. 4. The tire supporting and inflating device shown in FIG. 4 is mounted on a suitable fixed base 27 and has a lower tire supporting disk 28 that has an upwardly tapering peripheral portion 29 that fits within a bead of the tire, an annular supporting shoulder 30 being provided for positioning the tire bead. The lower tire supporting disk 28 has a central axially extending post 31 that receives a removable upper clamping disk 32, the disk 32 having a central sleeve 33 that slidably fits on the post 31 and being provided with a downwardly tapering peripheral portion 34 that fits within the upper bead of a tire supported on the disk 28, an annular shoulder 35 being provided for engagement with the outer face of the upper tire bead. The upper clamping disk 32 is retained on the post 31 by means of a suitable quick detachable retaining cap 36 that has a bayonet locking connection with lugs 37 formed on a reduced upper end portion 38 of the post 31. A pipe 39 is attached to the lower disk 28 to deliver steam or other fluid under pressure to the space between the disks 28 and 32 and to the interior of the tire supported by the disks. An air hose 40 is provided for delivering air under pressure to the space between the unadhered portions of the inner band and tire body through a fitting 41 that is applied to the tire on the tire building drum.

Steam under pressure is preferably supplied to the pipe 39 while air under pressure at least equal to the pressure of the steam is delivered through the hose 40 and fitting 41 to the space between the inner band and tire body. As soon as the pressure on the interior and exterior of the inner band is equalized, the nylon cords under tension will shrink the inner band away from the tread and side wall portions of the tire body as shown in FIG. 4.

The completed tire is shown mounted on a conventional wheel rim 42 which is provided with a valve stem 43 by means of which the inner chamber 44 formed by the inner band and rim 42 and air under substantially the same pressure may be admitted to the outer chamber 45 that is formed between the inner band and tire body.

Because of the fact that the rubber layers 5 and 7 are adhered together on the tire building drum in the bead portion of the tire and because of the adhesion of the rubber covered fabric plies of the tire body and inner band, the inner band is integrally united with the tire body around the bead rings and outwardly of the bead rings, so that the tire may be mounted upon a wheel rim of conventional construction in the same way as an ordinary single wall tire.

When the tire body is reinforced with cords or fabric which have no appreciable extensibility when subjected to pressure while hot on the tire supporting and inflating device, the reinforcing cords of the inner band can be advantageously disposed at an angle to the median plane of the tire considerably less than the angle of the cords of the tire body, so that the prestretched nylon cords of the inner band are stretched and put under additional tension when the tire is forced into the vulcanizing mold, somewhat greater shrinkage of the inner band being obtained due to the greater tension created in the heated cords.

When the cords of the tire body are lightly prestretched or unset nylon cords, the cords of the tire body may be placed at a smaller angle to the median plane of the tire to increase the stretching of these cords due to the expansion of the tire into the vulcanizing mold and due to the application of internal pressure to the heated tire body on the tire supporting and inflating device. By imparting a considerable stretch to the nylon cords of the tire body immediately after removal from the vulcanizing mold and maintaining the inflation pressure until the stretched cords are cooled and set, the cords of the tire body are made stretch resistant. By simultaneously stretching the cords of the tire body and shrinking the cords of the inner band a relatively deep outer chamber 45 may be provided so that the inner partition wall is more effectively protected against being punctured.

It is to be understood that in accordance with the provisions of the patent statutes, variations and modifications of the specific devices herein shown and described may be made without departing from the spirit of the invention.

What I claim is:

1. The herein described process of making a dual chamber pneumatic tire which comprises applying to a tire building form layers of uncured rubber and of a reinforcing cord fabric, the cords of which are prestretched nylon cords, to form an inner band, covering the exterior of said inner band, except along opposite side edges thereof, with a separating layer of adhesion preventing material, applying to the exterior of said inner band layers of rubber and of reinforcing cord fabric to form a tire body, adhering edge portions of said body to the uncovered edge portions of said inner band, securing a bead ring to the adhered portions of said body and band at each edge of said body, applying heat to said casing body and said inner band while applying fluid pressure to the interior of said band to press said inner band against the interior of said tire body to vulcanize the rubber and to create tension in said prestretched nylon cords, and delivering fluid under pressure into the space between the unadhered portions of said inner band and tire body while said nylon cords are hot to equalize the pressure on the interior and exterior of the unadhered portion of said inner band and cause the heated nylon cords to shrink and draw the unadhered portion of said band inwardly away from said tire body.

2. The herein described process of making a dual chamber pneumatic tire which comprises applying to a substantially cylindrical tire building form, layers of uncured rubber and of diagonally disposed prestretched nylon cords to form an inner band reinforced from edge to edge by reinforcing cords, covering the exterior of said band except for continuous strips along opposite edges thereof with a layer of adhesion preventing material, applying to the exterior of said band layers of uncured rubber and diagonally disposed reinforcing cords to form a tire body reinforced from edge to edge by reinforcing cords, adhering edge portions of said body to the uncovered edge portions of said inner band, applying a bead ring to each edge of said body and wrapping the cord reinforced edges of the tire body and inner band about said bead rings, applying fluid pressure to the interior of said band to expand said band and said body to toroidal shape in a tire vulcanizing mold, applying heat to said tire while maintaining said internal pressure to vulcanize the rubber, transferring the tire from the vulcanizing mold to a tire supporting and inflating device, applying a heated fluid under pressure to the interior of said tire, and delivering fluid under pressure to the space between the unadhered portion of the tire body and inner band to equalize the internal and external pressure on the unadhered portion of said inner band and cause said unadhered portion to be drawn inwardly away from said tire body by shrinkage of the heat tensioned nylon cords.

3. The process as set forth in claim 2 in which the reinforcing cords of the tire body are composed of a material that is not materially tensioned when subjected to a temperature of 300° F.

4. The process as set forth in claim 2 in which the cords of the tire body are rayon cords.

5. The process as set forth in claim 4 in which the reinforcing cords of the tire body are disposed at a greater angle to the center plane of the tire than the cords of the inner band.

6. The process as set forth in claim 2 in which the reinforcing cords of the tire body are unset nylon cords and in which the tire body is heated sufficiently to soften the unset nylon cords when the tire body is subjected to the pressure of the fluid delivered into the space between the unadhered portions of the tire body and the inner band and is expanded by the fluid pressure so applied.

7. The process as set forth in claim 6 in which the unset nylon cords of the tire body have a higher twist than the prestretched nylon cords.

8. The process as set forth in claim 6 in which the prestretched nylon cords extend diagonally across the tire at a lesser angle to the center plane of the tire than the cords of the casing body.

9. A pneumatic tire comprising a body of substantially toroidal form having a tread portion, bead portions having inextensible bead rings thereon and side wall portions connecting said tread and bead portions, said body being composed of rubber reinforced throughout its circumference with diagonally disposed cords extending from bead to bead and having their opposite end portions wrapped about said bead rings, said cords being disposed in superposed closely adjacent plies and the spaces between cords being filled with rubber, and an inner wall of substantially toroidal form spaced inwardly from said tread and side wall portions of said body and composed of rubber integral with the rubber of said bead portions and having embedded therein reinforcing cords extending from bead to bead and wrapped at opposite ends about said bead rings, the cords of said inner wall closely overlying the cords of the innermost ply of said body at said bead portions, the rubber enveloping the cords of said body and said inner wall in said bead portions being integrally united by simultaneous vulcanization.

10. A pneumatic tire according to claim 9 in which the cords of the inner wall are nylon cords.

11. A pneumatic tire according to claim 9 in which the cords of the tire body and the inner wall are nylon cords.

References Cited in the file of this patent

UNITED STATES PATENTS

| | | |
|---|---|---|
| 499,600 | Sherbondy | June 13, 1893 |
| 2,007,909 | State | July 9, 1935 |
| 2,200,916 | Crowley | May 14, 1940 |
| 2,625,980 | Castricum | Jan. 20, 1953 |
| 2,703,128 | Darrow | Mar. 1, 1955 |
| 2,703,132 | Darrow | Mar. 1, 1955 |
| 2,802,239 | Bosomworth et al. | Aug. 13, 1957 |
| 2,839,118 | Gramelspacher | June 17, 1958 |
| 2,942,642 | Pond | June 28, 1960 |